United States Patent [19]

Myagkov et al.

[11] 3,921,134

[45] Nov. 18, 1975

[54] DIGITAL COMPARATOR WITH MULTIPLE REFERENCES

[76] Inventors: Alexei Andreevich Myagkov, ulitsa Spartaka, 5, kv. 17; Mikhail Grigorievich Raigorodsky, ulitsa Gvardeiskaya, 20, kv. 85; Viktor Nikolaevich Uchakin, ulitsa Spartaka, 6, kv. 8; Ivan Ivanovich Khomyakov, prospekt Stroitelei, 64, kv. 3; Boris Sergeevich Yastrebo, ulitsa Gvardeiskaya, 22a, kv. 18, all of Saratov, U.S.S.R.

[22] Filed: Feb. 13, 1974

[21] Appl. No.: 442,143

[52] U.S. Cl. .............................................. 340/146.2
[51] Int. Cl.[2] .............................................. G06F 7/02
[58] Field of Search ...................... 340/146.2, 149 R

[56] References Cited

UNITED STATES PATENTS

| | | | |
|---|---|---|---|
| 3,492,644 | 1/1970 | Jensen | 340/146.2 |
| 3,495,216 | 2/1970 | Silerschotz | 340/146.2 |
| 3,757,298 | 9/1973 | Tumbush | 340/146.2 |

*Primary Examiner*—David H. Malzahn
*Attorney, Agent, or Firm*—Waters, Schwartz & Nissen

[57] ABSTRACT

A discrete value comparator comprises units for comparing equal-order digits and a unit for comparing the signs of the input and reference discrete values which are connected, via OR-circuits, to memory elements for storing comparison results and to units for determining the magnitude of an input value relative to a set of reference values. Each unit for comparing equal-order digits and the sign comparison unit use NOT-circuits and two groups of AND-circuits.

2 Claims, 1 Drawing Figure

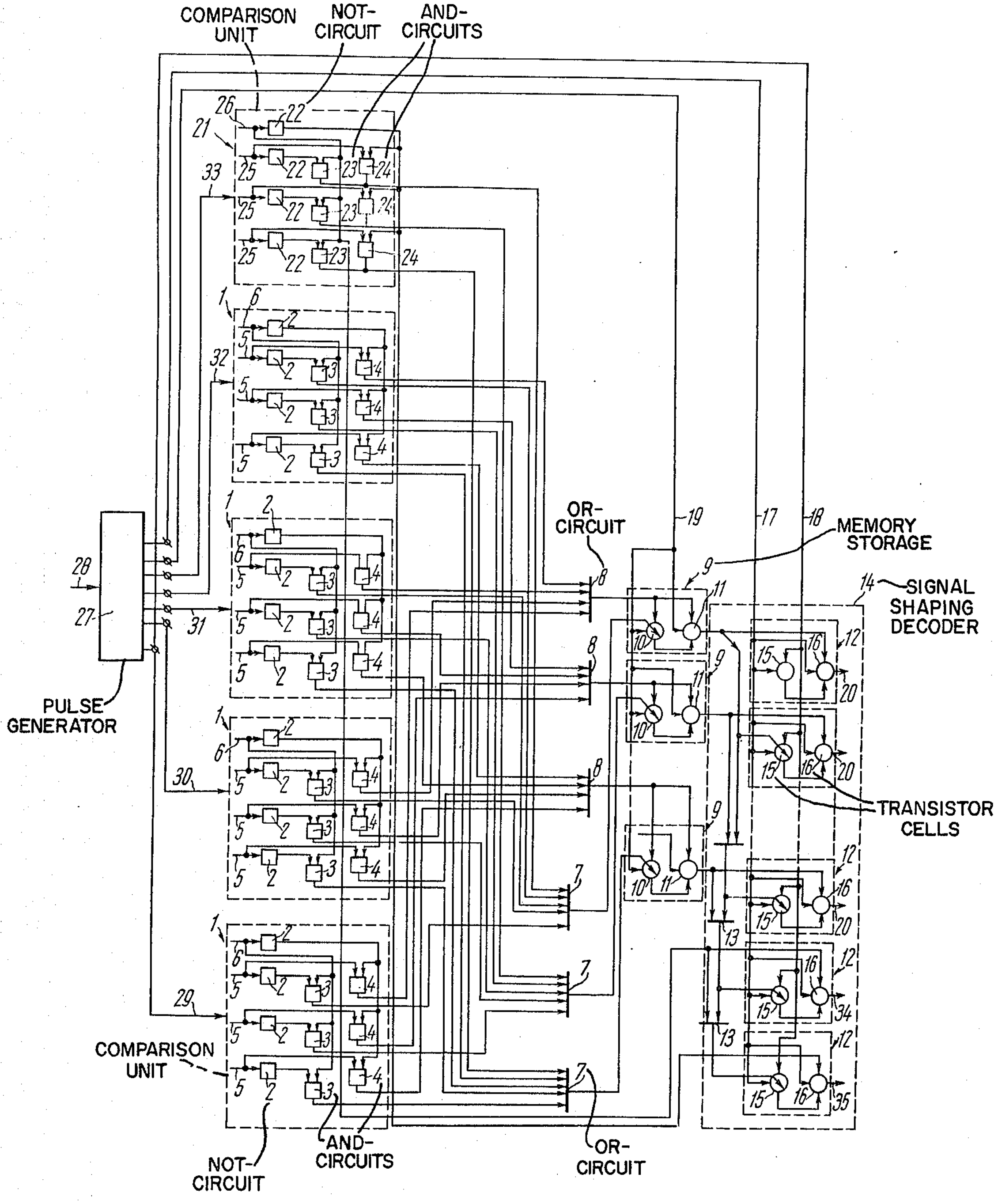
COMPARISON UNIT
NOT-CIRCUIT
AND-CIRCUITS
PULSE GENERATOR
OR-CIRCUIT
MEMORY STORAGE
SIGNAL SHAPING DECODER
TRANSISTOR CELLS
COMPARISON UNIT
NOT-CIRCUIT
AND-CIRCUITS
OR-CIRCUIT

DIGITAL COMPARATOR WITH MULTIPLE REFERENCES

The invention relates to devices for comparing and processing data and in particular to a discrete value comparator.

Known in the prior art are parallel-series electronic comparators whose operation is based on the principle of comparing the input values with the reference ones.

The known discrete value comparators are provided with units for comparing the equal order digits of an input discrete value and of the reference values. The inputs of each of these units are fed with the equal order digits of the input and reference discrete values, the units being coupled to the inputs of OR-circuits.

A disadvantage of the known devices for comparing discrete values resides in that they are unable to determine the range of values to which the input discrete value belongs, since the circuit arrangement of the known devices only makes it possible to find that the input value is either equal to, or differs from the reference values.

Another disadvantage of the known devices is that they can not determine the sign of the input discrete value that is being compared with the reference ones.

Still another disadvantage of the known devices resides in that they operate with a low accuracy and at a low speed because their circuits are not versatile.

A further disadvantage of the known devices for comparing discrete values is that they are cumbersome and consume too much power.

The primary object of the present invention is to provide a parallel-series electronic comparator whose circuit, using the same number of components as the comparators known in the prior art, will make it possible to determine the range of values to which the input discrete value belongs as well as to determine the sign of the latter.

Another object of the present invention is to provide a device operating with a high accuracy and at a high speed.

With these and other objects in view, the invention consists in that a parallel-series electronic comparator comprising units for comparing equal order digits of the input discrete value and of the reference values, the inputs of each of said units being fed with the equal order digit of the input and the reference discrete values and the units being coupled to the inputs of OR-circuits, is provided, according to the invention, with memory elements to store the comparison results, the number of which is equal to that of the reference values, and a decoder providing an output signal in accordance with the comparison results, which contains OR-circuits and inhibit AND-circuits, while each comparison unit uses NOT-circuits and two groups of AND-circuits, the first inputs of the AND-circuits in the first group being connected to the outputs of the NOT-circuits each having its inputs connected to the digit transfer bus of a respective reference discrete value, the second inputs of the AND-circuits in the first group being combined and connected to the digit transfer bus of the input discrete value, the bus being connected to the input of the NOT-circuits, while the first inputs of all AND-circuits in the second group are connected to the digit transfer bus of a respective discrete reference value, the second inputs of the AND-circuits in the second group are combined and connected to the output of the NOT-circuit which has its input connected to the digit transfer bus of the input discrete value; the OR-circuits are also divided into two groups, the OR-circuits in the in the first group transfer the comparison result when the digit of the input descrete value is represented by a logic "1", while that of the reference discrete value, by a logic "0"; the OR-circuits in the second group transfer the comparison result when the digit of the input discrete value is represented by a logic 0, while that of the reference discrete value, by a logic 1; the outputs of the AND-circuits in the first group are connected to the inputs of the OR-circuits in the first group, the outputs of the AND-circuits in the second group are connected to the inputs of the OR-circuits in the second group, and the output of each OR-circuit in the first group is connected to the inhibiting input of a respective memory element, the output of each OR-circuit in the second group is connected to the write input of a respective memory element, the output of each memory element being connected to the first write input of a respective inhibit AND-circuit and to the first input of the OR-circuit in the output signal shaping decoder which has its second input connected to the output of the preceding OR-circuit, this output being also connected to the inhibiting input of the inhibit AND-circuit, while the second write and read inputs of all inhibit AND-circuits and of the memory elements are connected to respective control clock-pulse buses.

It is preferable that the discrete value comparator should comprise a unit for comparing the signs of the input and reference values, using NOT-circuits and two groups of AND-circuits arranged so that the first inputs of the AND-circuits in the first group are coupled to the outputs of the NOT-circuits, each having its input connected to the bus transferring the sign of a respective value, and the second inputs of the AND-circuits in the first group are combined and connected to the bus transferring the sign of the input discrete value, the bus being connected to the input of the NOT-circuit and to the first write input of a respective inhibit AND-circuit and of the OR-circuit of the output signal shaping decoder, while each of the AND-circuits in the second group has its input coupled to the bus transferring the sign of a respective reference discrete value, the second inputs of the AND-circuits in the second group are combined and connected to the write input of a respective inhibit AND-circuit and to the output of the NOT-circuit which is connected to the bus transferring the sign of the input discrete value, while the paired outputs of the AND-circuits in the first and in the second groups are connected to the inputs of respective OR-circuits in the first group.

The parallel-series electronic comparator can be used in automatic classifiers of semiconductor devices and in automatic sorters of resistors and capacitors according to their accuracy grades and makes it possible to increase the speed of operation, the accuracy and the trouble-free service life of this equipment.

The invention will be better understood from the following description of a preferred embodiment thereof given by way of example and accompanied by a drawing which is a functional diagram of a parallel-series electronic comparator, according to the invention.

Units 1 for comparing equal-order digits of the input discrete value and of the reference values, the number of which depends on that of the digits in the data that is being processed and which in this particular case is equal to four, uses NOT-circuits 2 and two groups of AND-circuits 3 and 4.

The first inputs of the AND-circuits 3 in the first group are coupled to respective outputs of the NOT-circuits 2 in one group, the input of each of the latter being connected to a digit transfer bus 5 of a respective reference discrete value. The second inputs of the AND-circuits 3 are combined and connected to a digit transfer bus 6 of the input discrete value, the bus being connected to the input of another NOT-circuit 2.

The first inputs of each AND-circuit 4 in the second group are connected to the bus 5 that serves to transfer the digit of a respective discrete value while the second inputs of these AND-circuits 4 are combined and connected to the output of that NOT-circuit 2 which has its input connected to the bus 6.

The outputs of the AND-circuit 3 in the first group are connected to the inputs of respective OR-circuits 7 in the first group which transfer the comparison results satisfying the criterion "more". In other words, these circuits will transfer the comparison result input only when the digit of the discrete value is represented by a logic 1 while that of the reference discrete value is represented by a logic 0. The outputs of the AND-circuits 4 in the second group are connected to the inputs of respective OR-circuits 8 in the second group which is characterized in that the OR-circuits 8 belonging to it will transfer the comparison results satisfying the criterion "less". In other words, these circuits will transfer the comparison result only when the digit of the input discrete value is represented by a logic 0 while that of the reference discrete value, by a logic 1.

Each memory element 9 to store comparison results, the total number of which corresponds to that of reference discrete values and in this particular case is chosen to be three, comprises two ferrite-transistor cells 10 and 11 which are well known in the art. These cells are arranged in an inhibit AND-circuit which is also well known. The write inputs of the cells 10 and 11 are combined while the cell 10 has its inhibiting input connected to the output of the respective OR-circuit 7 in the first group. Connected to the write inputs of the cells 10 and 11 is the output of the respective-OR-circuit 8 in the second group. Each of the three memory elements 9 has its output connected to the input of each respective inhibit AND-circuit 12 and to the first input of a respective OR-circuit 13 of the output signal shaping decoder 14 for measuring input values relative to reference values. Each inhibit AND-circuit 12 comprises two ferrite-transistor cells 15 and 16. The function of the result input of the inhibit AND-circuit 12 are performed by the write input of the cell 16, while the inhibiting input of the cell 15 is connected to the second input of the OR-circuit 13, this input being connected to the output of the preceding OR-circuit.

The read inputs of the cells 15 and 16 are combined and connected to a clock-pulse bus 17 while the write inputs of the cells 15 are connected to a clock-pulse bus 18. The read inputs of the cells 10 and 11 in the memory elements 9 are connected to a clock-pulse bus 19. The outputs of the cells 16 serve as the comparator outputs; they can be connected to an external display (not shown) via buses 20.

A unit 21 for comparing the signs of the input and reference discrete values also uses NOT-circuits 22 and two groups of AND-circuits 23 and 24. The first inputs of the AND-circuits 23 in the first group are connected to the outputs of the NOT-circuits 22, the inputs of each of the latter being connected to a bus 25 that transfer the sign of the respective reference discrete value. The second inputs of the AND-circuits 23 in the first group are combined and connected to a bus 26 that transfers the sign of the input discrete value. The bus 26 is connected to the input of the NOT-circuit 22, to the write input of the cell 16 in the respective (fourth) inhibit AND-circuit 12, the input being disconnected from the output of the cell 11, and to the first input of the respective OR-circuit 13. The first input of each AND-circuit 24 in the second group is connected to the bus 25 that transfers the sign of the respective discrete value, while the second inputs of these AND-circuits 24 are combined and connected to the write input of the cell 16 in the respective (fifth) inhibit AND-circuit 12, the input being disconnected from the output of the cell 11, as well as to the output of the NOT-circuit 22 which is connected to the bus 26 transferring the sign of the input discrete value. The outputs of the AND-circuits 23 and 24 are connected in pairs and coupled to the inputs of the respective OR-circuits 7 in the first group.

The clock-pulse buses 17, 18 and 19 are connected to the outputs of a clock-pulse generator 27 which has its input connected to an external control device (not shown).

The parallel-series electronic comparator operates as follows. When a signal appears at an input bus 28 of the clock-pulse generator 27 the latter will start shaping clock pulses fed in succession, via buses 29, 30, 31 and 32, to the units 1 for comparing equal-order digits. These units compare the input discrete value with the reference ones, preset in each unit 1, in a digit-by-digit manner beginning with the lowest-order digit. Simultaneously, the first clock pulse passing via the clock-pulse bus 18 records a logic 1 in the ferrite-transistor cell 15.

Each of the AND-circuits 3 in the first group will produce a logic 1 at its output when the bus has a logic 1 and the bus 5 has a logic 0. Each of the AND-circuits 4 in the second group will produce a logic 1 when the bus 6 has a logic 0 and the bus 5 has a logic 1. In case the digits being compared are equal, the outputs of the AND-circuits 3 and 4 in both groups will produce a logic 0. From the outputs of the AND-circuits 3 the comparison result is applied, via the OR-circuits 7, to the inhibiting inputs of the cells 10 in the memory elements 9 in a digit-by-digit manner and in synchronism with the control clock pulses. The OR-circuits 7 will transfer the comparison result only when the digit of the input discrete value is represented by a logic 1 and that of the reference value, by a logic 0.

From the outputs of the AND-circuits 4 of each unit 1 the comparison result is fed, via the OR-circuits 8, to the write inputs of the cells 10 and 11 in the memory elements 9 in a digit-by-digit manner and in synchronism with clock pulses. The OR-circuits 8 will transfer the comparison result only when the digit of the input discrete value is represented by a logic 0, while that of the reference value is represented by a logic 1.

When a signal appears at the outputs of the OR-circuits 8, the cells 10 and 11 in the memory elements 9 will record a logic 1, but when a signal source appears at the outputs of the OR-circuits 7, the logic 1, that has earlier been written in the cells 10, will be erased. The memory elements 9 start being interrogated at the moment when a clock pulse appears at the bus 19.

As soon as the units 1 finish comparing the input and the reference data as to their absolute values the unit 21, on receiving a clock pulse that arrives from the output of the generator 27 via a bus 33, will start comparing them with respect to their signs. In case the sign of the input value does not coincide with that of any of the reference values, the respective output of the sign comparison unit 21 will have a logic 1 which will be fed to the inhibiting input of the respective memory element 9 via the respective OR-circuit 7.

Signals (logic 1s) appearing simultaneously at all output buses of the memory elements 9 at the moment they are being interrogated, are indicative of the fact that the input value is less than the smallest of the three reference value as far as their absolute values are concerned and that it has the same sign.

The fact that there are no signals (logic 1s) appearing simultaneously at all output buses at the moment the memory elements 9 are being interrogated will mean that the input value either exceeds the biggest of the reference values or differs from them each in sign.

Hence, the output of each memory element 9 presents the result of comparing the input value with the respective reference value with respect to both the absolute value and the sign. These comparison results are applied, via respective OR-circuits 13, to the inhibiting inputs of the cells 15 of the output signal shaping decoder 14. The write inputs of the cells 16 in the same decoder 14 receive the comparison results directly. A clock pulse that has by that arrived to the write inputs of the cells 15 records a logic 1 in these cells 15.

If the reference discrete values are arranged in accordance with their absolute values in increasing order, i.e. so that the first value is smaller than the second while the second is smaller than the third, the output of the first memory element 9 will present the result of comparing the input value with the first reference value which is the smallest, the output of the next memory element 9 will present the result of comparing the input value with the second reference value, while the output bus of the third memory element 9 will produce the result of comparing the input value with the maximum one of the reference values. The next clock pulse appearing at the bus 17 initiates the interrogation of the decoder 14; the signal in this case will only appear at one of the output buses 20 since the signal at the output buses of the memory elements 9 allows the output from a respective inhibit AND-circuit 12 and inhibits the output from all successive inhibit AND-circuits 12. In this particular case, the address signal will appear at the output of the first of the inhibit AND-circuits 12, provided the input value is less than the first reference value which is the smallest of them and coincides with it in sign; the input value signal will appear at the output of the second inhibit AND-circuit 12 if the input value is less than the second reference value which exceeds the first one and if it coincides with the two of them in sign. In case the input value exceeds the biggest of the three reference ones as far as their absolute values are concerned then, depending on the sign of the input discrete value, a signal will appear either at the bus 34 of the fourth inhibit AND-circuit 12 or at the bus 35 of the fifth inhibit AND-circuit 12.

If the input value is less than the minimum reference one, in absolute terms, and if it does not coincide with any of the the reference values as far as the sign is concerned then, depending on the sign of the input discrete value, a signal will appear either at the output bus 34 or at the output bus 35.

Thus, the external display (not shown) will indicate the range of the reference values to which the input value belongs as well as the sign of the latter.

The parallel-series electronic comparator can be used in automatic classifiers of semiconductor devices and in automatic sorters of resistors and capacitors according to their accuracy grades and makes it possible to increase the speed of operation and the measurement accuracy of this equipment as well as to raise its trouble-free service life up to 200 hours.

The comparator described above can also be used in bench equipment for ageing receiver and amplifier tubes where the output value is a time interval.

The equipment for winding coil capacitors which comprises a digital capacitance meter can profit from the use of the proposed discrete value comparator for the purpose of monitoring the discrepancies between the actual and nominal ratings of capacitors.

An advantage of using the proposed comparator consists in that it allows to considerably simplify the equipment it is used with and to bring down the power consumption requirements.

What is claimed is:

1. Series-parallel electronic comparator comprising units for comparing equal-order digits of an input discrete value with reference discrete values, each unit having inputs being fed with similar digits of the input discrete value and the reference discrete values; a digit transfer bus for said input discrete value; digit transfer buses for said reference discrete values; NOT-circuits in each said unit for comparing equal-order digits, the input of the first NOT-circuit being connected to said digit transfer bus of the input discrete value, and the input of each of the remaining NOT-circuits being connected to each said digit transfer bus of a respective reference discrete value; a first group of AND-circuits in each said unit for comparing equal-order digits, each AND-circuit having a first and a second input and an output; a second group of AND-circuits in each said unit for comparing equal-order digits, each AND-circuit having a first and a second input and an output; said AND-circuits in said first group having the first inputs thereof connected to the outputs of respective of said remaining NOT-circuits, said second inputs thereof being combined and connected to said digit transfer bus of the input discrete value, said AND-circuits in said second group having the first inputs thereof connected to said digit transfer buses for transferring the digits of respective reference discrete values and the second inputs thereof being combined and connected to the output of said first NOT-circuit, the input thereof being connected to said digit transfer bus of the input discrete value; a first group of OR-circuits for transferring the comparison result when said digit of said input discrete value is represented by a logic 1 and said digit of said reference discrete value, by a logic 0; a second group of OR-circuits transferring the comparison result when said digit of said input discrete value is represented by a logic 0, said digit of said reference discrete value, by a logic 1; said OR-circuits in said first group having their inputs connected to said outputs of said AND-circuits in said first group; said OR-circuits in said second group having their inputs connected to said outputs of said AND-circuits in said second group; memory elements for storing comparison results, each having writing, reading and inhibit inputs, and inhibit inputs being connected to the outputs of respective of said OR-circuits in the first group, and the writing inputs being connected to the outputs of respective of said OR-circuits in the second group; a decoder for generating an output signal according to comparison results, said decoder comprising a group of inhibit AND-circuits, each having first and second writing inputs, first and second reading inputs, an inhibit input and an output, a group of OR-circuits, each having two inputs and an output, said inputs of said inhibit AND-circuits and said inputs of said OR-circuits of said decoder being coupled to said outputs of said memory elements so that said output of each of said memory elements is connected directly to said first writing input of said respective inhibit AND-circuit and through said series-connected OR-circuits to said inhibit inputs of all succeeding of said inhibit AND-circuits of said decoder; a plurality of control buses for receiving synchronizing clock pulses, some of said control buses being coupled to said respective units for comparing equal-order digits, each said bus being coupled to each said unit for respectively comparing equal-order digits, one of said control buses further being connected to said reading inputs of all of said memory elements, and the remaining of said control buses being respectively connected to said combined first and second reading inputs and to said combined second writing inputs of all of said inhibit AND-circuits in said decoder for generating an output signal according to comparison results; and a clock-pulse generator for synchronizing operation of said series-parallel electronic comparator, said clock-pulse generator including one starting input and a plurality of outputs, each being connected to one of said control buses respectively.

2. A series-parallel electronic comparator as claimed in claim 1 which comprises: a unit for comparing the signs of the input and reference discrete values; a bus for transferring the sign of said input discrete value; buses for transferring the signs of said reference discrete values; NOT-circuits in said unit for comparing the signs of the input and reference discrete values, the input of the first of which is connected to said bus for transferring the sign of the input discrete value, while the input of each of said remaining NOT-circuits is connected to each respective said bus for transferring the sign of the reference discrete value; a first group of AND-circuits in said sign comparison unit each having a first and a second input and an output, said first input being connected to the outputs of said remaining NOT-circuits respectively whose inputs are connected to said respective buses transferring signs of reference discrete values, said second inputs being combined and connected to said bus transferring the sign of the input discrete value, said bus further being connected to the input of said first NOT-circuit and to an input of a respective OR-circuit and a first writing input of a respective inhibit AND-circuit in a decoder for generating output signal; a second group of AND-circuits in said sign comparison unit each having a first and a second input and an output, said first input being connected to said buses transferring signs of reference discrete values respectively, and said second inputs being combined and connected to the output of one of said first NOT-circuits whose input is connected to said bus transferring the sign of the input discrete value, said output of said first NOT-circuit being also connected to a first writing input of a respective inhibit AND-circuit within a decoder for generating output signal, said outputs of said AND-circuits of said second group being connected to outputs of respective of said AND-circuits of the first group and to respective inputs of the OR-circuits of the second group; and a control bus to receive a synchronizing clock pulse and to couple said sign comparison unit with a respective output of a clock-pulse generator.

* * * * *